Dec. 23, 1958 W. M. GRANGER 2,865,482
AUTOMATIC CONTROL OF RADIO TRANSMITTERS
OR OTHER EQUIPMENT
Filed June 14, 1954 4 Sheets-Sheet 2

Inventor
William M. Granger
by
Stevens Davis Miller & Mosher
his attorneys

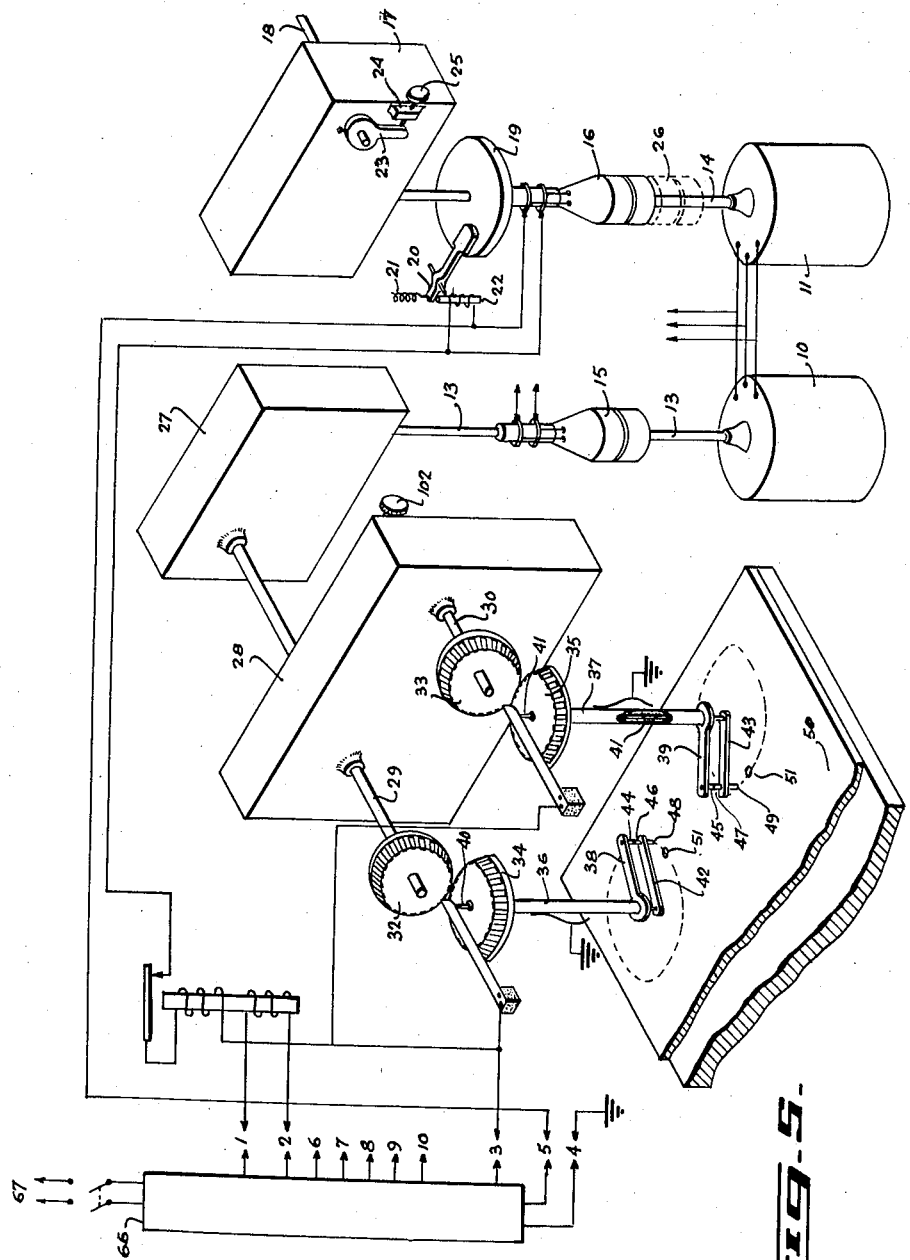

Dec. 23, 1958  W. M. GRANGER  2,865,482
AUTOMATIC CONTROL OF RADIO TRANSMITTERS
OR OTHER EQUIPMENT
Filed June 14, 1954  4 Sheets-Sheet 4

Inventor
William M. Granger
by Stevens, Davis, Miller & Mosher
his attorneys

United States Patent Office 2,865,482
Patented Dec. 23, 1958

2,865,482

AUTOMATIC CONTROL OF RADIO TRANSMITTERS OR OTHER EQUIPMENT

William M. Granger, Sechelt, British Columbia, Canada

Application June 14, 1954, Serial No. 436,650

Claims priority, application Canada November 16, 1953

9 Claims. (Cl. 192—142)

This invention relates to apparatus for setting the controls of equipment from a remote point and is particularly adapted to the remote control of radio transmitters, receivers and similar equipment.

Previous devices for this purpose have suffered from numerous disadvantages. They have, for the large part, involved the use of mechanical stops, dogs, catches, and similar means to engage the controlled member and stop it at the desired place. It will be evident that such structure involves a further disadvantage which is that the number of pre-arranged settings is limited to the number of stops and catches that can be positioned within the limits of travel of the controlled member. Also, it is only with difficulty that alterations can be made in the settings. New settings cannot be added without disturbing existing settings.

The above and other disadvantages of existing systems are overcome by the present invention which offers the following features.

It can, without adjustment, set a control or a group of controls to any one of an unlimited number of pre-arranged settings.

New settings or combinations, which from time to time are required, may be introduced without affecting previous settings.

The unit is electrically connected to the controlled equipment and the controlled equipment need not be fitted with mechanical stops or catches.

In the preferred embodiment the invention comprises at least three electric motors, one of said motors rotating a sequence switch through a gear chain, a second motor driven by an alternating current source driving a rotating feeler finger over a card having a hole punched therein in the path of said feeler finger and a third motor driven by the same alternating current source and driving the member being controlled. A series of relays operated from a direct current source through the sequence switch actuate electrically operated clutches between the motors and their driven members. The drive to the third motor is controlled by the feeler finger so that when it encounters and drops into a hole it interrupts such drive and stops the controlled member. The angular position of the stopping point of the controlled member is determined by the position of the hole in the card. If a different setting is required it is merely necessary to use a different card with the hole in the appropriate place.

Other features of the invention will be evident from the following description with reference to the accompanying drawings in which:

Figure 5 is a diagrammatic drawing of the mechanism without the sequence switch.

Figure 1:
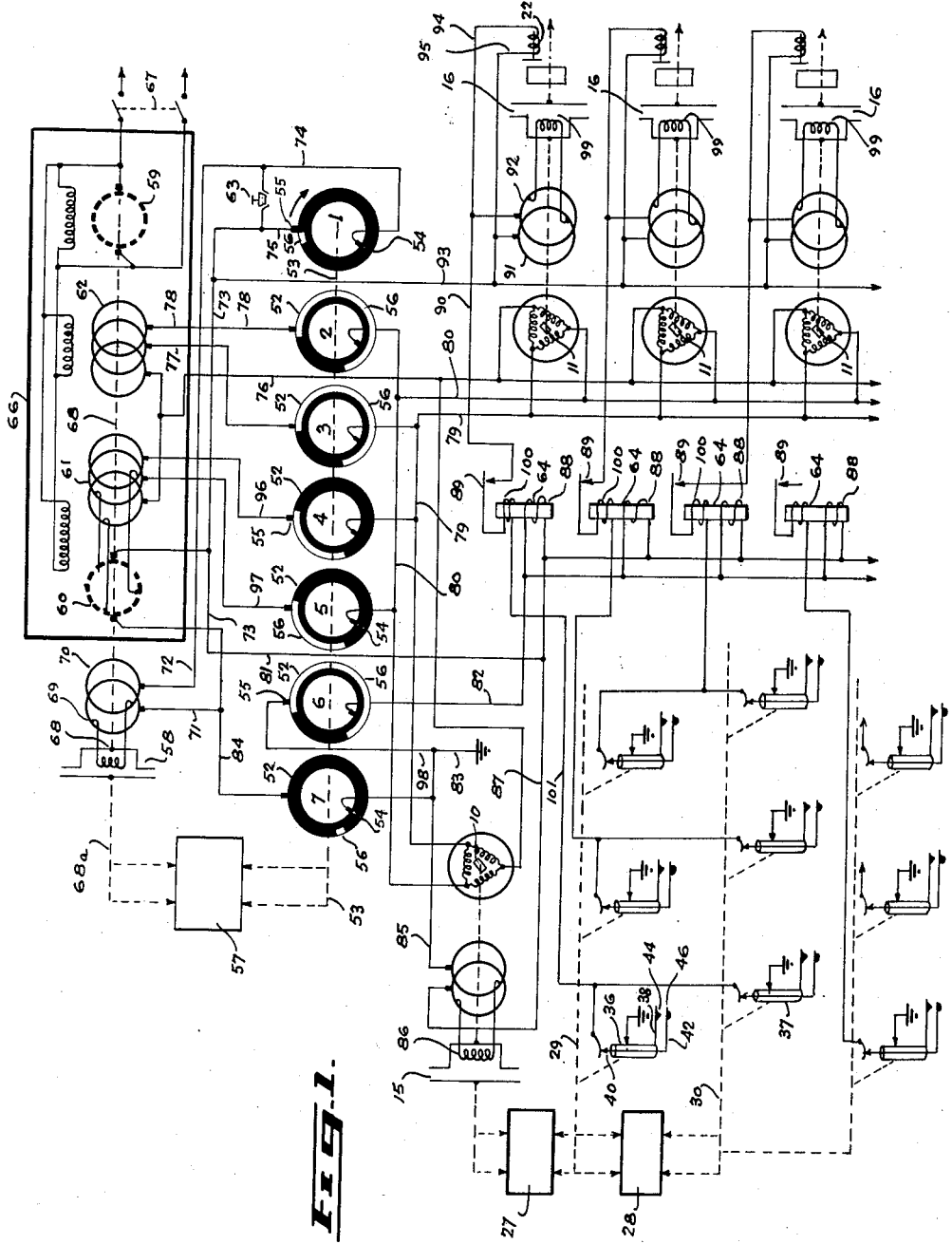
Figure 1 is a circuit diagram of the electrical connections.
Figure 4:
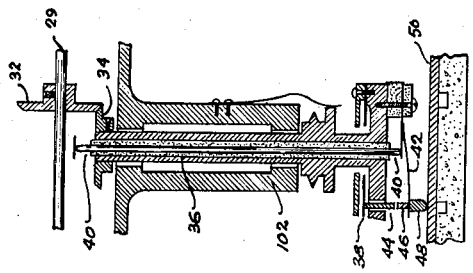
Figure 4 is a side elevation in cross-section of a feeler finger assembly.
Figure 2:
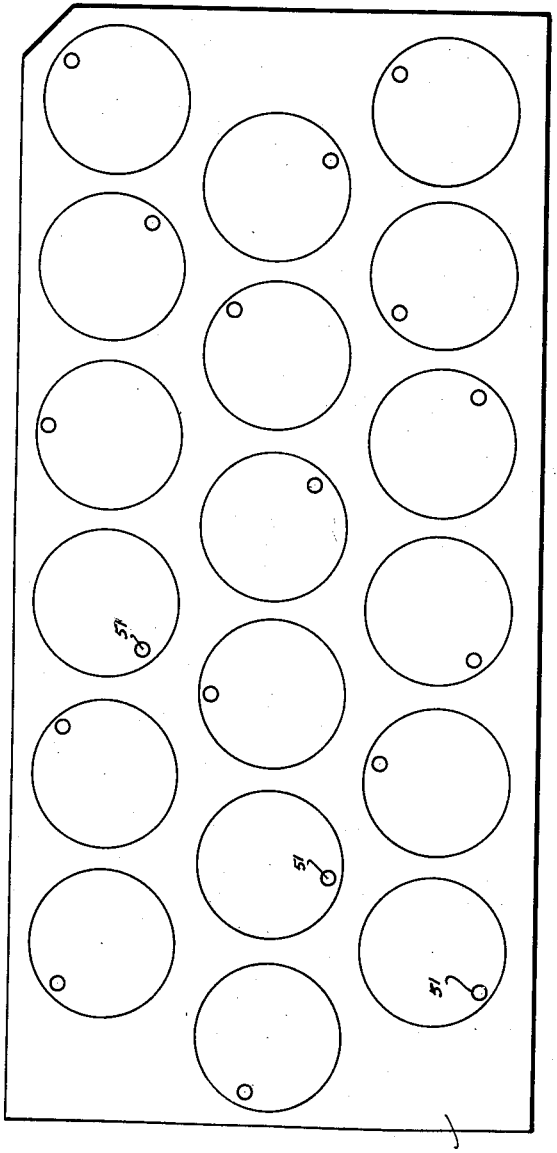
Figure 2 is a plan view of a card for use in the device.

In order to clarify the description of the apparatus reference will first be had to Figure 5 which is a diagrammatic view of the apparatus. The sequence switch which will be described in detail later is not shown in this figure but will be referred to in the description. Figure 5 has been drawn in this diagrammatic form in the interests of simplicity and some features of the invention which will be introduced later are not shown. This figure and the description referring thereto are intended as an introduction to the more detailed description which is to follow.

Referring now to Figure 5 it will be seen that there are two synchronous, polyphase, alternating current motors 10 and 11 driving shafts 13 and 14 respectively. Shafts 13 and 14 are broken and between the two parts thereof are inserted electrically operated clutches 15 and 16. Motor 11 drives, through shaft 14, clutch 16, and reduction gears 17, the member 18 which is the member being controlled. In this description emphasis is placed on the adoption of the device to control rotatable members such as shafts but it is to be appreciated that the device is equally suited for controlling other members through suitable linkages.

Mounted on shaft 14 between the clutch 16 and the reduction gears 17 is a brake disc 19. Besides the brake disc and mounted on any suitable support is a brake lever 20. The brake lever 20 is urged against the brake disc 19 by means of spring 21 and when the machine is in operation is held away from disc 19 against the action of the spring 21 by means of electro-magnet 22. The electro-magnet 22 is electrically connected in parallel with the electrically operated clutch 16 in the manner which will be later described, so that when the clutch is engaged to enable the motor to drive the shaft 14, the brake arm 20 is released from its engagement with disc 19 to allow free rotation of the shaft 14. As soon as the circuit is interrupted the clutch is released and the brake applied to stop the rotation of shaft 14 immediately.

In addition, friction "drags," or brakes (not illustrated), may be incorporated in the reduction gears 17, in order to take up slack and backlash in the gearing and increase the accuracy of setting of the controlled member.

Shaft 18, the controlled member, is provided at its free end with a dog or stop 23. Mounted on a suitable support such as the casing of the reduction gear chain is an adjustable stop comprising a block 24 with a set screw 25 threaded therethrough. The forward rotation of motor 11 will cause the clockwise rotation of shaft 18. This is the direction in which rotation takes place during the setting operation. In order to commence the setting operation the motor 11 is caused to rotate in the reverse direction until dog 23 encounters the end of set screw 25. This establishes a definite starting point from which forward rotation may begin. The frictional engagement in clutch 16 is sufficiently loose to allow slippage when the dog 23 contacts stop 25. As an alternative, a second slipping clutch, shown in dotted lines in Figure 5 as 26, can be placed in shaft 14 for this purpose.

A similar dog and stop is provided on shaft 30 to stop the shafts 36 and 37 at their proper starting point. The dog is not shown in Figure 5 but the stop may be seen as 102.

From the foregoing description it will be seen that an electric motor is provided to rotate the controlled member. Also provided is a clutch to engage and disengage the said motor, a brake to stop the rotation of the shaft when the clutch is disengaged and a mechanical stop to accurately locate the shaft 18 at its starting point. This is the portion of the apparatus directly connected to the equipment being controlled. The portion of the apparatus which is described below may be located remote from the controlled equipment and connected thereto electrically.

Figure 3:
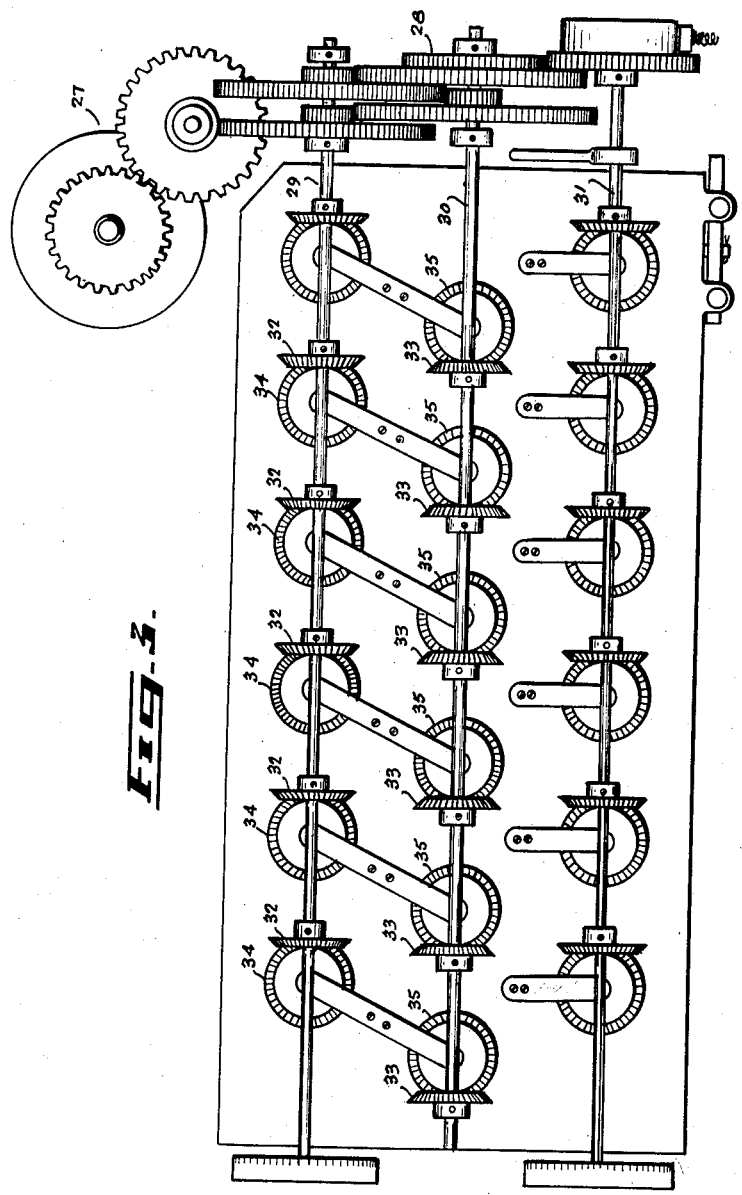
Figure 3 is a plan view of the gear drive for the feeler fingers.

Still referring to Figure 5 motor 10 will be seen to drive shaft 13 which shaft is separated into two sections by means of electrically operated clutch 15. Shaft 13, through reduction gear trains 27 and 28 drives shafts 29 and 30 in Figure 5. In Figure 3 it will be noted that there are three shafts 29, 30 and 31 and it is to be appreciated that there may be as many shafts as are required. In Figure 5 two shafts only are shown in the interests of clarity and simplicity. These shafts rotate at different speeds, for example, shaft 29 might make forty revolutions to one revolution of shaft 30. In this way the accuracy of the device increases forty times over the apparatus with only one shaft. This accuracy can be increased by coupling as many shafts together as are needed. Where only rough settings are needed, one shaft will suffice. Shafts 29 and 30 carry bevel gears 32 and 33 which operatively engage similar bevel gears 34 and 35 on shafts 36 and 37. Shafts 36 and 37 are at right angles to shafts 29 and 30 and in practice, as shown in Figure 5, it is convenient to have shafts 29 and 30 horizontal and shafts 36 and 37 vertical. Shafts 36 and 37 are rotated by gears 34 and 35 and carry at their lower ends radially extending arms 38 and 39. Within shafts 36 and 37 and rotating with them but electrically insulated therefrom are secondary shafts 40 and 41. These shafts also carry radially extending arms 42 and 43 which lie beneath and parallel to arms 38 and 39. On the lower side of arms 38 and 39 are two electrical contacts 44 and 45 which oppose two similar contacts 46 and 47 on the upper side of arms 42 and 43. On the lower side of arms 42 and 43 are two rods 48 and 49 which extend downwardly and contact the surface of card 50 which lies beneath them. Arms 38 and 39 and 42 and 43 are made of resilient material and are set so as to normally be urged apart by the resiliency of the arms. They are, however held together by contact of rods 48 and 49 on the card so that contacts 44 and 46 and 45 and 47 touch and complete the electrical circuits. In the card 50 and in the circular paths of each of rods 48 and 49 is punched a hole 51. As the shafts 36 and 37 rotate the rods 48 and 49 drop into the holes 51 and break the circuit between 44 and 46 and between 45 and 47. The ends of rods 48 and 49 are rounded so that as the shafts rotate the rods drop into the holes 51 and ride out again without interrupting the rotation. The contacts 44 and 46 and 45, 47 are connected in a circuit in parallel so that both rods must simultaneously encounter holes to break the circuit. The circuit passing through these contacts controls the clutch and brake associated with the motor which drives the member being controlled. It, therefore, will be seen that the operation of the device is briefly as follows:

(1) The motors are run in the reverse direction to a starting point.

(2) The motors are run in the forward direction until both rods 48 and 49 encounter holes which disconnects the motor 11 from the controlled member 18.

The location of holes 51 in the card 50 can be changed so as to stop the shaft 18 at any desired spot.

The foregoing was a generalized description and the following description will deal in detail with various parts of the machine broadly disclosed above.

The sequence switch

The sequence switch in this device is of the usual type and comprises circular discs mounted on a rotatable shaft. Portions of the circumference of each disc are cut away so as to make or break contact with contact members mounted along the switch. The sequence switch is best illustrated in Figure 1 which is a circuit diagram of the apparatus. Here the switch is shown as comprising seven discs or segments which are mounted on a shaft shown in this figure as the dotted line 53. On each disc are two electrical contacts 54 and 55. Contacts 54 are always in electrical connection with discs 52. The circumference of the discs 52 is cut away in segments as at 56 so that contact 55 can make the circuit when it touches the unreduced segment of the discs and break the circuit when the reduced segment passes beneath it. The reduced segments are so arranged that the circuits are made and broken in the proper sequence and for the proper length of time. The sequence switch shaft 53 is driven through reduction gears shown by block 57, magnetically engaged clutch 58 and motor 59 shown in Figure 1. Motor 59 also drives a direct current generator 60 which supplies direct current to operate the relays and clutches. A source of low frequency alternating current is shown at 61 and a source of high frequency alternating current is shown at 62. The high frequency alternating current is connected in circuits to drive motors 10 and 11 shown in Figures 1 and 5 through discs 2 and 3 of the seven section sequence switch. The low frequency alternating current is connected through discs 4 and 5 to drive the said motors in the forward direction. The high frequency current drives the motors in the reverse direction so that a rapid return to the starting position may be effected. The low frequency current drives the motors in the forward direction at a slower speed.

An operating button 63 is provided in a direct current circuit to close the circuit to actuate the electro-magnetic clutch 58 to cause rotation of the sequence switch and the initiation of the operating cycle.

Section 6 of the sequence switch is also in a direct current circuit and controls relays 64 and clutch 15 which engages motor 10 with gear trains 27 and 28 to rotate shafts 29 and 30 and thus shafts 36 and 37.

Section 7 of the sequence switch also controls the relay circuit in a manner which will be described in the following description of the operation of the device.

As will be appreciated, the sequence switch may be constructed in any of many possible forms. It could for example comprise spring contacts operated by cams.

Operation

In this description it will be assumed that the device is initially inoperative due to all control circuits being open, and as the description proceeds the device will actuate and energize various circuits in operating sequence until one cycle is complete and the device again lies dormant.

The A. C.–D. C. motor-generator set shown generally at 66 is connected to the electrical mains through a main cut-off switch 67. The closing of switch 67 causes the driving motor 59 to operate, thereby driving the high frequency A. C. generator 62, the low frequency A. C. generator 61 and the D. C. generator 60 which are all mounted on the common shaft 68. The construction and electrical connections within the A. C.–D. C. motor-generator set are commonly known and as these form no part of the present invention they will not be described in greater detail than is necessary to show the electrical connections to the other parts of the apparatus.

At the end of shaft 68 remote from the driving motor 59 is the electrically operated clutch 58. This clutch comprises two members one of which carries an electromagnet connected through slip rings 69 and 70 to the D. C. source 60, through conductor 71, conductor 72, switch 63 and conductor 73. The shaft 68a continues from the clutch 58 to the reduction gear box 57 from which emerges shaft 53 on which is mounted the sequence switch.

Section 1 of the sequence switch is in parallel with switch 63, through conductors 74 and 75. Thus when switch 63 is closed clutch 58 is engaged and shaft 68a rotates the gear train 57 which drives shaft 53 and the sequence switch. The rotation of the sequence switch in the clockwise direction causes section 1 to close and keep the circuit engaging clutch 58 closed until the completion of the cycle.

At the beginning of the cycle, sections 2 and 3 of the sequence switch close a circuit from the high frequency A. C. source 62 through conductors 76, 77, 78, sections 2 and 3 of the sequence switch, conductors 79 and 80 to motors 10 and 11. This causes the motors 10 and 11 to rotate rapidly in their reverse direction, and as seen in Figure 5, would cause shaft 18 to rotate counterclockwise to bring dog 23 up against stop 25 thus establishing the starting position for shaft 18, and would bring the dog on shaft 30 in contact with stop 102 to establish the starting point for the feeler fingers on shafts 36 and 37.

At the same time as sections 2 and 3 close their circuit, section 6 closes a D. C. circuit to actuate the relays 64 through conductors 81, relay coil 88, conductor 82, section 6 of the sequence switch, conductor 98, section 7 of the sequence switch and conductor 84 to the D. C. source. Section 7 of the sequence switch is closed during this time and energizes a D. C. circuit consisting of conductor 84, section 7 of the sequence switch, conductor 85, the magnetic coil 86 in clutch 15, conductor 87, and conductor 81 back to the D. C. source. The energizing of relays 64 closes switches 89 thereof to energize and engage clutches 16 to connect motors 11 to the controlled shaft. This same circuit consisting of conductors 90, slip rings 91 and 92 and conductors 93 and 73, is in parallel with a shunt circuit consisting of conductors 94 and 95 and coil 22 of the brake releasing mechanism disclosed in Figure 5, whereby motors 11 are energized, clutches 16 are engaged and brake arms 20 are released so that each motor 11 can rotate the controlled member 18 freely in the reverse direction.

After the shaft or member 18 has been brought to its starting position, the sequence switch will have rotated to the point where sections 2 and 3 open their circuits and disconnect motors 10 and 11 from the high frequency source of A. C. At the same time section 7 of the sequence switch opens the D. C. circuit controlling clutch 15 and since section 6 of the switch is dependent on section 7 for its source of D. C. relays 64 are de-energized and clutches 16 are disengaged, brake arms 20 are applied and the entire apparatus comes to rest with the member 18 at its starting position.

At this point the status of the machine is as follows:

Section 1 of the sequence switch is completing a D. C. circuit through conductor 71, D. C. source 60, conductors 73, 75, 74 and 72 to engage clutch 58 to rotate the sequence switch. Sections 2 and 3 of the sequence switch are open thus stopping the reverse rotation of motors 10 and 11. Section 7 is open thus de-energizing the clutch 15 and relays 64 and hence clutches 16. The machine is therefore at a standstill except for motor 59 and the generators and sequence switch.

The next step in the cycle is the closing of sections 4 and 5 to complete a circuit to motors 10 and 11 from the low frequency A. C. source 61. This is done through conductors 96 and 97, sections 4 and 5 of the sequence switch and conductors 79 and 80 to the motors 10 and 11. It will be noted that in this connection, the phase wires 96 and 97 are reversed from the position of the corresponding phase wires 77 and 78. This causes the motors 10 and 11 to rotate in the forward direction. The rotation is at a slow speed due to the fact that they are now supplied with low frequency A. C.

It will be noted that there is a time lag between the completion of the low frequency motor circuit and the recompletion of the D. C. circuit controlled by section 7 of the sequence switch. This is to ensure that the two motors are up to synchronous speed before the clutches are engaged.

When the motors 10 and 11 are up to speed section 7 closes and section 6 opens almost simultaneously. In fact, section 6 opens just after section 7 closes. The reason for this is that while section 7 controls clutch 15 through conductor 85, coil 86, conductor 87, coil 88, conductor 82, section 6 of the sequence switch and conductor 98 it cannot actuate coil 88 to close switch 89 of relays 64 if section 6 is open. Therefore, section 6 stays closed long enough to energize coil 88 when section 7 closes. When section 7 closes a circuit is completed as follows:

From the D. C. source through conductor 73, conductor 93, slip ring 91, coil 99, slip ring 92, conductor 90, switch 89, a coil 100 of relay 64, conductor 101, to the shaft 40, member 42, contact 46, contact 44, member 38, shaft 36 to ground. This ground returns through section 7 of the sequence switch to the other side of the D. C. source. This circuit, by reason of its passing through coil 100 keeps switch 89 closed as long as the circuit is complete. Section 6 of the sequence switch has now opened but this does not affect relays 64 as coil 100 is energized.

The device is now ready to set the member 18 at the desired position. Since section 6 of the sequence switch is open, switch 89 remains closed because of the current in coil 100. The circuit through switch 89 controls the clutches 16 and brake coils 22 so that as long as this circuit is complete the member 18 will continue to be rotated by motor 11. This circuit may only be broken, once the cycle has begun, by a break in the circuit between contacts 44 and 46, and 45 and 47 on members 38 and 42, and 39 and 43 of the feeler finger assembly. It is to be noted that the feeler finger assembly rotated by shaft 30 is electrically in parallel with the feeler finger assembly rotated by shaft 37. This means that in order for the circuit to be broken the contacts 44 and 46 must be open at the same time. Since, as stated above, one of the feeler fingers rotates at a greater rate than the other, the contacts on the slower finger may open before those of the faster finger and may well close after those of the faster finger have closed. However, as long as the fast finger contacts open during the time that the slow finger contacts are open, or vice versa, the circuit will be broken thereby de-energizing the relays 64. The opening of the two sets of contacts, as well as the registration of the feeler fingers with their respective holes or irregularities may therefore be described as being concurrent.

When contacts 44 and 46 and 45 and 47 separate and break the circuit de-energizing the relays 64 the clutches 16 disengage and brake arms 20 are applied to stop member 18 at its required position. The sequence switch continues its rotation until section 1 opens which disengages clutch 58 to stop the sequence switch before the cycle repeats. The cycle being complete the machine now lies dormant until the operating button 63 is again pushed.

I claim:

1. An apparatus for remotely controlling angular displacement of a shaft: comprising at least two synchronous electric motors; indexing means having at least one plane surface, said surface having formed therein an irregularity; a feeler finger held in contact with and for rotation relative to said plane surface; a first electrically-operable clutch; a first of said electric motors being effective to cause relative rotation between said feeler finger and said indexing means through said first clutch, said irregularity being formed in the path of the relative movement of said feeler finger; a second electrically-operable clutch; a second of said motors being effective to cause rotation of said shaft through said second clutch; and means actuated by contact between said feeler finger and said irregularity to de-energize said second clutch.

2. An apparatus for remotely controlling angular displacement of a shaft: indexing means having a plurality of plane surfaces, each of said surfaces having formed therein an irregularity; a plurality of feeler fingers held one in contact with and for rotation relative to each of said plane surfaces; a first electrically-operable clutch; a train of gears; a first of said electric motors being effective to cause relative rotation between each of said plane surfaces and the feeler finger associated therewith through said first clutch and said train of gears, said train of gears being such as to cause the rate of such relative rotation to differ with each plane surface, said irregularities being formed one in the path of the relative movement of each of said feeler fingers; a second electrically-operable clutch; a second of said electric motors being effective to cause rotation of said shaft through said second clutch; and means actuated by concurrent registration of said feeler fingers with irregularities in the paths of relative movement thereof to de-energize said second clutch.

3. An apparatus as claimed in claim 2 in which said indexing means is a punch card, said plane surfaces being areas in the same surface of said punch card; and said irregularities are holes punched in said punch card.

4. An apparatus for remotely controlling angular displacement of a shaft: comprising a first and a second electric motor, said electric motors being synchronous motors; a punch card having a plurality of plane areas on one side thereof, each of said plane areas having formed therein a hole; a plurality of feeler fingers held one in contact with and for rotation relative to each of said plane areas; a first electrically-operable clutch; a train of gears; said first motor being effective through said clutch and said train of gears to rotate said feeler fingers each at a different speed; said holes being formed one in the path of rotation of each of said feeler fingers; a second electrically-operable clutch; said second motor being effective through said second clutch to rotate said shaft; and circuit breaking means associated with each of said feeler fingers; said circuit breaking means being electrically connected each in series with said second clutch and in parallel with one another; registration between a feeler finger and the hole formed in the path of rotation thereof acting to open the circuit breaking means associated with such feeler finger.

5. An apparatus as claimed in claim 4 in which said feeler fingers are held generally parallel to said plane areas and comprise each two generally parallel members spring-biassed away from one another but held in contact with one another by contact between one of said members and said punch card; said members constituting said circuit breaking means.

6. An apparatus for remotely controlling angular displacement of a shaft: comprising a first, a second and a third electric motor, at least said first and said second electric motors being synchronous motors; a punch card having a plurality of plane areas on one side thereof, each of said plane areas having formed therein a hole; a plurality of feeler fingers held one in contact with and for rotation relative to each of said plane areas; a first electrically-operable clutch; a train of gears; the first motor being effective through said first clutch and said train of gears to rotate said feeler fingers each at a different speed; said holes being formed one in the path of rotation of each of said feeler fingers; a second electrically-operable clutch, said second motor being effective through said second clutch to rotate said shaft; stop means associated one with said shaft and one with said train of gears, said stop means providing datum points by limiting the extent of said shaft and said feeler fingers; a first source of three phase alternating current; a second source of three phase alternating current; the current supplied by said first source of alternating current being at a higher frequency than that supplied by said second source of alternating current; a source of direct current; a sequence switch, said third motor being in rotation-transmitting-connection with said sequence switch; said sequence switch being arranged so as first electrically to connect said first and said second motors to said first source of alternating current and to connect said first and said second clutches to said source of direct current whereby to effect rotation of said shaft and said feeler fingers to said datum point; then electrically to connect said first and said second motors to said second source of alternating current in phase sequence reverse to that of such first connection and to connect said first and said second clutch to said source of direct current; and means actuated by concurrent registration of said feeler fingers with the holes formed in the paths of rotary movement thereof to de-energize said second clutch.

7. An apparatus as claimed in claim 6 in which said means to de-energize said second clutch comprises circuit breaking means associated with each of said feeler fingers and electrically connected each in series with said second clutch and in parallel with one another.

8. An apparatus as claimed in claim 7 in which said feeler fingers are held generally parallel to said plane areas and comprise each two generally parallel members spring-biassed away from one another but held in contact with one another by contact between one of said members and said punch card, said members constituting said circuit breaking means.

9. An apparatus as claimed in claim 8 including braking means associated with said shaft; said braking means comprising a brake shoe, a braking surface provided on said shaft with which said brake shoe may coact; spring means urging said brake shoe into contact with said braking surface; and electro-magnetic means for holding said brake shoe away from said braking surface; said electro-magnetic means being connected in series with said second clutch and said feeler finger members.

References Cited in the file of this patent

UNITED STATES PATENTS

| | | |
|---|---|---|
| 2,413,211 | Brian | Dec. 24, 1946 |
| 2,656,497 | Schwerghofer et al. | Oct. 20, 1953 |
| 2,672,067 | Hansell | Mar. 16, 1954 |
| 2,677,285 | Volk | May 4, 1954 |
| 2,683,514 | Hardway | July 13, 1954 |